June 24, 1930.  R. WEDEBERG  1,767,494
BOOSTER PUMP
Filed Aug. 23, 1928
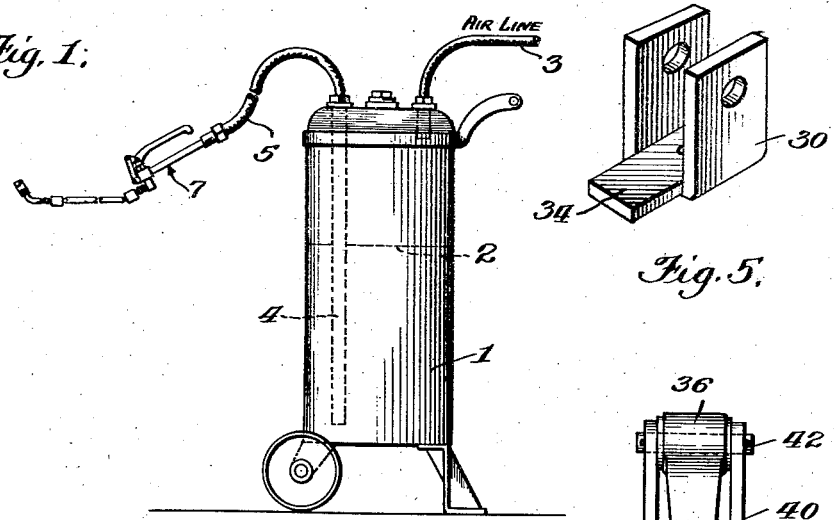
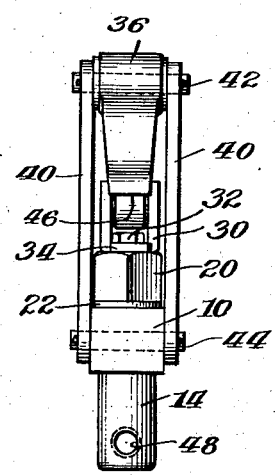
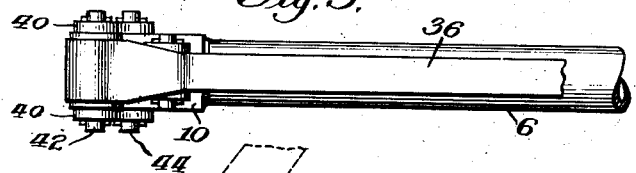
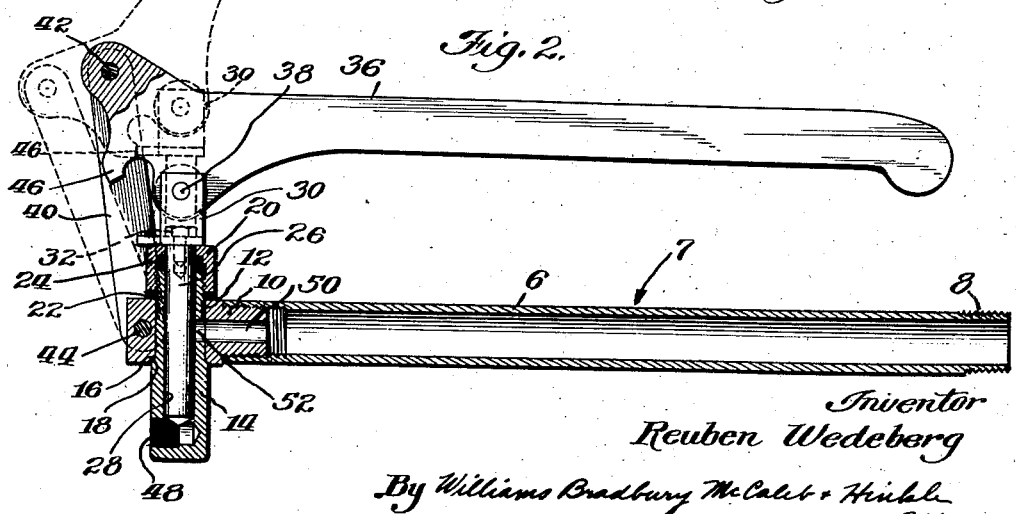
Inventor
Reuben Wedeberg
By Williams Bradbury McCaleb & Hinkle
Attys.

Patented June 24, 1930

1,767,494

UNITED STATES PATENT OFFICE

REUBEN WEDEBERG, OF CHICAGO, ILLINOIS, ASSIGNOR TO ALEMITE CORPORATION, OF CHICAGO, ILLINOIS, A CORPORATION OF DELAWARE

BOOSTER PUMP

Application filed August 23, 1928. Serial No. 301,536.

My invention relates, generally, to lubricating apparatus, and more particularly to hand operated booster pumps utilized to control the flow and increase the pressure on lubricant supplied from a source under low pressure to a bearing to be lubricated.

It is an object of my invention to provide a booster pump for lubricating apparatus which is simple in construction, which may be economically manufactured and which is efficient in operation.

Another object of my invention is to provide an improved booster pump made of a plurality of parts which are either of standard stock, stampings, or may be made upon an automatic screw machine.

A further object is to provide an improved booster pump with improved means for limiting the movement of the operating handle.

Other objects will appear from the following description, reference being had to the accompanying drawings, in which Fig. 1 is an illustration of a lubricating apparatus embodying my invention;

Fig. 2 is a vertical sectional view of the pump mechanism and an elevation of the handle mechanism;

Fig. 3 is a fragmentary plan view of the booster pump;

Fig. 4 is an end elevation; and

Fig. 5 is a perspective view of the handle stop and bracket.

Referring to the drawings, and particularly to Fig. 1, I have shown a portable lubricant container 1 containing a supply of lubricant 2 therein which is normally under air pressure received through the air supply line 3. A lubricant outlet pipe 4 is connected by a flexible hose 5 to the outer end of the booster pump 7. The flow of lubricant through the booster pump is controlled by the pump in a manner hereinafter to be described and to a suitable coupling which is adapted to be detachably connected to fittings carried by the parts to be lubricated.

Referring now more particularly to the booster pump, it comprises a pipe-like handle 6, which is threaded as at 8 to be attached to the flexible hose 5. The other end of the pipe handle 6 is threaded to a body portion 10 which is transversely bored at 12 to receive the booster pump cylinder body 14. The lower end of the bore 12 is slightly flared at 16 and the cylinder body 14 has a tapered surface 18 complementary to the flared portion 16. The body 14 is drawn upwardly by a packing nut 20 threaded over the upper end of the body 14 so as to bring the surfaces 16 and 18 into sealing contact. A suitable gasket 22 is interposed between the packing nut 20 and the body 10 and a packing 24 serves as a stuffing box for a plunger 26 which is reciprocable within a bore 28 formed in the cylinder body 14. It will be apparent that by turning down on the packing nut 20 the seals between the surfaces 16 and 18, between the packing nut 20 and body 10, and between the plunger 26 and its cylinder body 14 will be made effective.

The upper end of the plunger 26 has a handle bracket 30 attached thereto by a hexagonal head machine screw 32. The bracket 30, which is best shown in Fig. 5, has a forwardly projecting stop portion 34 which is integral with the bracket which is otherwise substantially U-shaped in cross section. An operating lever 36 is pivotally connected to the bracket 30 by a pin 38 and is also pivotally connected to a pair of links 40 by a pivot pin 42. The lower ends of the links 40 are pivotally attached to the body 10 by a pin 44 which passes transversely through the body.

The handle 36 has a stop lug 46 formed integrally therewith, the latter being adapted to abut the end of the stop 34 when the operating lever is moved to the end of its stroke (as shown in dotted lines in Fig. 2). The abutment of the lower surface of the bracket 30 with the top surface of the packing nut 20 limits the movement of the lever and plunger in the opposite direction. The lower end of the cylinder body 14 has an outward bore 48 which is threaded to receive a suitable fitting by which connection may be made to a part to be supplied with lubricant. The body 10 is axially bored at 50 and is adapted to register with an inlet port 52 formed in the cylinder body 14.

In the operation of the device the pipe handle 6 is connected by a flexible hose 5, as shown, with a source of lubricant under relatively low pressure such as the container 1. Lubricant will flow through the hollow pipe handle 6, passageway 50, inlet 52 and into the cylinder 28, assuming the plunger to have been raised to the dotted line position in Fig. 1. When held in this position, lubricant may flow under low pressure directly through the cylinder 28 to the bearing or other part to be supplied with lubricant.

When, however, a bearing having a high resistance to the flow of lubricant is encountered, or for any other reason a high pressure on the lubricant is desired, the lever 36 is moved from the dotted line to the full line position, thereby forcing the plunger 26 downwardly into the cylinder 28, cutting off the inlet port 52 and expelling the lubricant from the cylinder under extremely high pressure. Any quantity of lubricant desired may thus readily be supplied to the bearing at high pressure by repeated reciprocation of the operating lever 36.

Due to the shape of the head of the lever, the maximum pressure is obtained as the plunger approaches the end of its discharge stroke. It will be noted that as the lever approaches its normal position it, together with the links 40, has a toggle action which makes it possible to exert a very great force on the plunger 26 and consequently an extremely high pressure upon the lubricant. The capacity of the high pressure plunger pump is, however, not sacrificed to gain this high pressure since a large percentage of the increase in pressure on the lubricant is due to the mechanical advantage of the lever and leverage arrangement rather than merely in the diameter of the plunger 26 and its cylinder.

The booster pump may easily be taken apart to clean the various parts and to replace any part which has become worn.

The invention is capable of wide variation within equivalent limits and I contemplate such variation as may be desirable or useful in the particular adaptation of the invention shown, or in its adaptation to other machines. I do not restrict myself in any unessential particulars, but what I claim and desire to secure by Letters Patent is:

1. In apparatus of the class described, the combination of a pipe handle, a transversely bored body secured thereto, a cylinder member fitting in the transverse bore of said body, means to clamp said member in said body, a plunger reciprocable in said member, a bracket mounted upon the outer end of said plunger, an operating lever, a pivotal connection between said bracket and said operating lever, a pair of links pivotally mounted on said body and pivotally connected to said lever, and cooperating means on said lever and said bracket to limit the stroke of said lever.

2. In apparatus of the class described, the combination of a body member having a passageway therethrough, means to supply lubricant thereto under pressure, a detachable cylinder member passing transversely through said body and having a cylindrical bore adapted to be supplied with lubricant through the passageway in said body member, a plunger in said cylinder member, a packing around said plunger at the end of said cylinder, and a packing nut threaded over the end of said cylinder member and adapted to compress said packing and rigidly clamp said member in said body.

3. In high pressure lubricating apparatus of the class described, the combination of a handle providing a lubricant conduit therein, a body member carried by said handle, a cylinder member mounted in said body and supplied with lubricant from the conduit in said handle, a plunger reciprocable in said cylinder, and a single means for clamping said cylinder in said body and effecting a seal between said plunger and said cylinder.

4. In lubricating apparatus of the class described, a high pressure cylinder, conduit means for supplying lubricant thereto, said cylinder carried by said conduit means and projecting from both sides thereof, a plunger in said cylinder, and a single member adjustable to create a seal between said cylinder and both sides of said conduit means and also to create a seal between said cylinder and said plunger.

5. In lubricating apparatus of the class described, a high pressure cylinder, means for supplying lubricant thereto, a plunger in said cylinder, a handle for operating said plunger, and a member pivotally connecting said plunger and said handle and providing means for limiting movement of said handle, said means comprising a bracket detachably secured to the upper end of said plunger.

6. In apparatus of the class described, the combination of a body member having a passageway therein, means to supply lubricant thereto under pressure, a detachable cylinder member passing transversely through said body and having a cylindrical bore adapted to be supplied with lubricant through the passageway in said body member, a plunger in said cylinder member, means for operating said plunger comprising a bracket mounted upon the outer end of said plunger, an operating lever, a pivotal connection between said bracket and said operating lever, a pair of links pivotally mounted on said body and pivotally connected to said lever, cooperating means on said lever and said bracket to limit the stroke of said lever, a packing around said plunger at the end of said cylinder, a packing nut threaded over the end of said cylinder member and adapted to compress said packing and rigidly clamp said member in said body, and a second packing held by said nut to form a seal between said body member and said cylinder member.

7. In lubricating apparatus of the class described, a high pressure cylinder, conduit means for supplying lubricant thereto, said cylinder carried by said conduit means and projecting from both sides thereof, a plunger in said cylinder, a single member adjustable to create a seal between said cylinder and both sides of said conduit means and a seal between said cylinder and said plunger, a handle cooperable with said conduit means for operating said plunger, and a member pivotally connecting said plunger and said handle and providing means for limiting movement of said handle in one direction.

8. In apparatus of the class described, the combination of a body having a passageway therethrough, means to supply lubricant thereto under pressure, a detachable cylinder member passing transversely through said body and having a cylindrical bore adapted to be supplied with lubricant through the passageway in said body, a plunger in said cylinder member, means for operating said plunger and means for limiting the stroke thereof, a packing around said plunger at the end of said cylinder, and a packing nut threaded over the end of said cylinder member and adapted to compress said packing and rigidly clamp said member in said body.

9. In lubricating apparatus of the class described, a high pressure cylinder, means for supplying lubricant thereto, a plunger in said cylinder, a handle for operating said plunger, and a member detachably secured to said plunger and pivotally connecting the latter with said handle and providing means for limiting movement of said handle in both directions.

10. In apparatus of the class described, the combination of a pipe handle, a transversely bored body secured thereto, a cylinder member fitting in the transverse bore of said body, means to clamp said member in said body, a plunger reciprocable in said member, a bracket mounted upon the outer end of said plunger, an operating lever, a pivotal connection between said bracket and said operating lever, a pair of links pivotally mounted on said body and pivotally connected to said lever, said lever so constructed that the maximum leverage is obtained as the plunger approaches the end of its discharge stroke, and cooperable means on said lever and said bracket to limit the stroke of said lever.

11. In apparatus of the class described, the combination of a pipe handle, a transversely bored body secured thereto, a cylinder member fitting in the transverse bore of said body, means to clamp said member in said body, a plunger reciprocable in said member, a bracket mounted upon the outer end of said plunger, an operating lever, a pivotal connection between said bracket and said operating lever, and a pair of links pivotally mounted on said body and pivotally connected to said lever, said lever so constructed that the maximum leverage is obtained as the plunger approaches the end of its discharge stroke.

12. In apparatus of the class described, the combination of a pipe handle, a transversely bored body secured thereto, a cylinder member fitting in the transverse bore of said body, means to clamp said member in said body, a plunger reciprocable in said member, a bracket mounted upon the outer end of said plunger, an operating lever having a toggle action to obtain maximum leverage at the end of the discharge stroke, a pair of links pivotally mounted on said body and pivotally connected to said lever, and cooperating means on said lever and said bracket to limit the stroke of said lever.

In witness whereof, I hereunto subscribe my name this 14th day of August, 1928.

REUBEN WEDEBERG.